United States Patent Office 3,516,689
Patented June 23, 1970

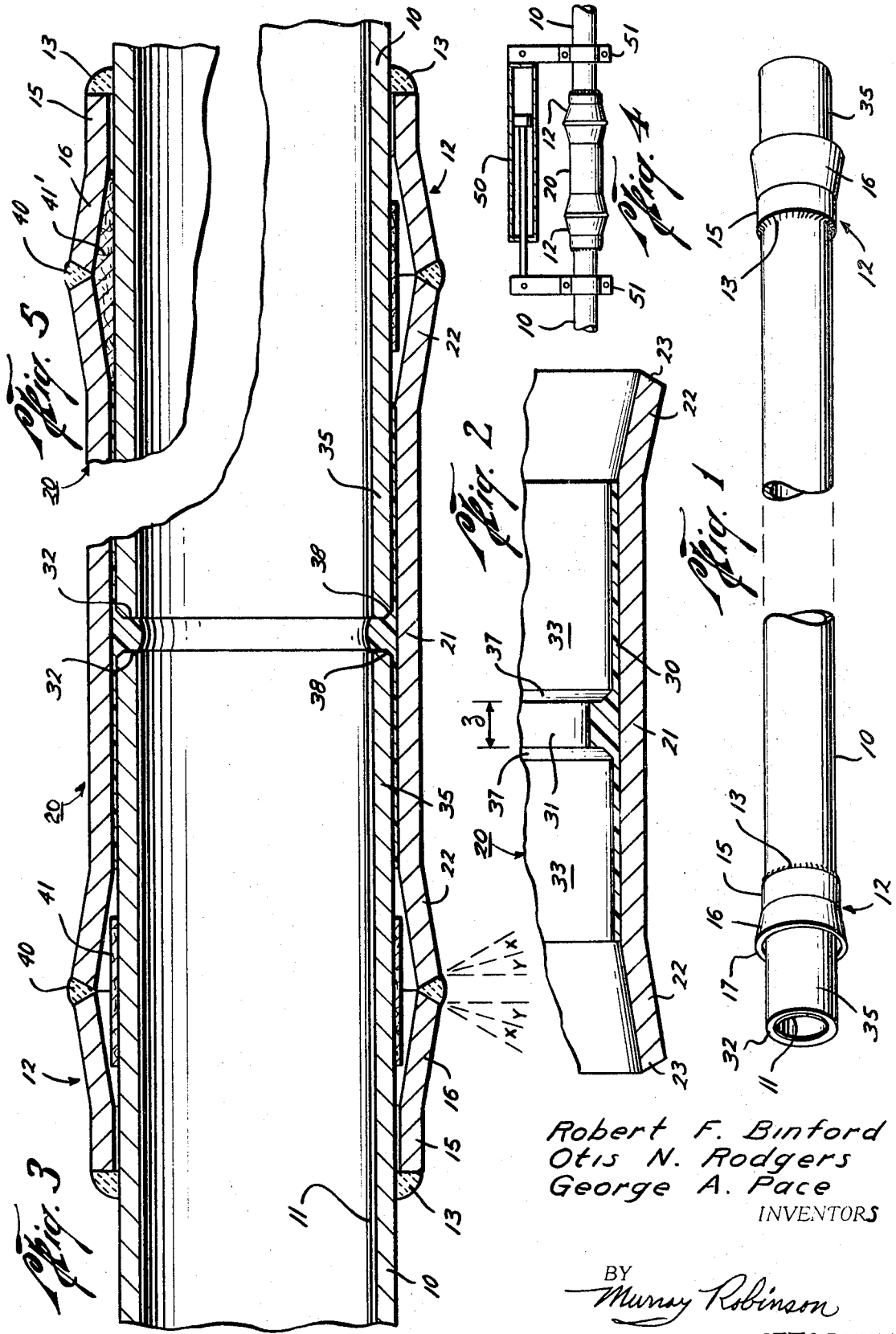

3,516,689
WELDED PIPE CONNECTION
Robert F. Binford, Otis N. Rodgers, and George A. Pace, Great Bend, Kans., assignors to Flexweight Corporation, Great Bend, Kans., a corporation of Kansas
Filed Aug. 19, 1968, Ser. No. 753,475
Int. Cl. F16l 11/12, 13/02, 55/00, 59/16
U.S. Cl. 285—47                                9 Claims

ABSTRACT OF THE DISCLOSURE

Flaring collars are welded adjacent pipe ends. Pipe is then lined with plastic. Coupling having flaring ends and carrying a seal conforming to pipe ends is placed over adjacent pipe ends. Hydraulic device pulls ends together compressing seal therebetween. Coupling ends are welded to collars. Hydraulic device may be moved to next connection when weld is completed enough to hold tension, rest of weld being finished later. Asbestos bands around pipe inside junctures of coupling and collars electrically insulate welding arc from pipe. Spacing of weld area from pipe insulates pipe from heat. Length of flaring ends of collars and coupling dissipates heat of weld area before it travels through collars and coupling to pipe.

BACKGROUND OF THE INVENTION

Field of the invention

This invention pertains to method and apparatus for weld-connecting plastic lined pipe.

Brief discussion of the prior art

According to the prior art, short cylindrical collars were welded to each pipe near its end before lining the pipe with plastic. For connecting adjacent pipe ends there was employed a cylindrical coupling. The coupling was provided over most of its length with a synthetic rubber lining having a triangular cross section flange near its mid-portion extending radially inwardly from the inner periphery of the coupling. The coupling was placed over the pipe ends and the ends drawn together with a hydraulic or mechanical device, flowing the rubber of the liner into the space between pipe ends. The unlined ends of the coupling were then tack welded to the free ends of the collars. After a number of pipes were welded together, the line was filled with water and the welds were completed, the water keeping the pipe lining cool during the welding.

In the prior art construction, the coupling's inner diameter was greater than the pipe's outer diameter only by the minimum thickness of the rubber liner. The collars had inner diameters equal to that of the couplings, excluding the coupling liner. This spaced the weld from the pipe but the radial spacing was small so that complete welding of the collars to the coupling could not be accomplished without filling the pipe with water for otherwise the heat of welding would damage the pipe lining. It was, therefore, necessary to weld the pipe in two stages, the initial tack welding stage and then later on the completion stage with water in the pipe line.

With the prior art construction there was difficulty in positioning the collars on the pipe when welding them to the pipe ends prior to lining the pipe. The slightest canting or lack of concentricity would cause a collar to touch the pipe at its free end where it was to be welded to a coupling. This would cause the weld heat to penetrate to the pipe lining and destroy the lining during its initial tack welding.

With the prior art construction, even if the collars were fairly concentric with the pipe there was always danger of spoiling the pipe lining during the tack welding operation prior to filling the line with water. This might occur, for example, if the tack welding was continued over too long a time. In addition, during the completion of the welds, if the pipe was not perfectly filled with water, leaving air spaces adjacent the plastic, overheating and blistering of the plastic resulted.

In any event, filling the pipe with water and then emptying as was required by the prior art, was time consuming, and due to the close spacing of pipe and collars and coupling, there was difficulty with the prior art in making a strong weld.

A further difficulty with the prior art was experienced with the tapered liner of the coupling, the tapered liner not always flowing properly into the gap between the pipe ends in an amount sufficient to cover the extremities of the pipes to protect them against corrosion.

SUMMARY OF THE INVENTION

According to the invention the difficulties with the prior art are overcome by using long collars that flare away from the pipe at their free ends. Similarly, the coupling is provided with flaring ends. The weld area is thus spaced radially from the pipe far enough to prevent the plastic lining of the pipe from rising to a destructive temperature. In addition, the length of the collars is great enough to prevent heat transfer down the collars to the pipe sufficient to raise the pipe lining to a destructive temperature.

The small ends of the flaring collars may be just enough larger than the normal pipe diameter to accommodate the largest diameter pipe permissible under the tolerance allowed for oil field pipe. This, coupled with the flaring free ends of the collars, solves the problem of cooling and nonconcentricity of the collars.

A band of electrically insulating refractory material is placed between the pipe and each of the junctures between the coupling and collars to prevent the electric welding arc from jumping from the coupling and collar directly to the pipe, thereby preventing destruction of the plastic lining of the pipe by the heat of the arc contacting the pipe directly.

The need for filling the pipe with water to keep the plastic cool during welding is thereby eliminated, and the dangers previously experienced during the initial tack welding operation disappear. The entire welding operation can be completed without pause. Reject pipe due to canting or nonconcentric collars is eliminated.

The pipe ends are usually externally bevelled to facilitate welding. The coupling liner is provided with an internal radial flange initially shaped to conform to the pipe extremities. This insures complete coverage of the pipe extremities when the pipe ends are drawn together.

Preferably the arc shield band is shaped to fill the space between the weld area and pipe, thereby to exclude any water.

BRIEF DESCRIPTION OF THE DRAWINGS

For a detailed description of a preferred embodiment of the apparatus of the invention and a preferred mode of carrying out the method of the invention, reference will now be had to the accompanying drawings wherein FIG. 1 is a perspective showing a length of pipe incorporating the invention;

FIG. 2 is a fragmentary axial section through a coupling incorporating the invention;

FIG. 3 is a fragmentary axial section through the connection between two pipe ends in accordance with the invention;

FIG. 4 is a schematic view of two pipe ends being drawn together by a hydraulic device in accordance with the method of the invention; and FIG. 5 is a view similar to FIG. 3 showing a modification.

Referring to FIG. 1, there is shown a length of circular cross section, steel or other metal pipe 10 having a lining 11 of plastics material e.g. polyvinylchloride. Adjacent each end of the pipe there is a steel or other metal annular collar 12 of preferably circular transverse cross section welded to the pipe at 13. Each collar includes a substantially cylindrical centering portion 15 having an inner diameter just large enough to slip easily over the outer periphery of the pipe having the largest outer diameter within the tolerances set by standards for the nominal pipe size. Integral with each centering portion 15 is a conical or other flaring weld portion 16 having an outwardly facing bevelled end 17. Referring also to FIG. 3, the sum of the bevel angle X and the taper angle Y, at the end of the flaring portion 16 is preferably about thirty degrees, e.g. in the range of fifteen to sixty degrees.

Referring now to FIG. 2, there is shown a steel or other metal coupling 20, of preferably circular transverse cross section including a central cylindrical portion 21 and integral therewith at each end a flaring weld portion 22 having a bevelled end face 23. Referring also to FIG. 3, the bevel angle X plus the taper angle Y at the end of each flaring portion is preferably about thirty degrees, e.g. in the range of fifteen to sixty degrees. Coupled with the taper and bevel of the flaring portion of the collars, there is thus opened a V groove for welding having an angle of thirty to one hundred twenty degrees, e.g. sixty degrees. Other angles could be used, but feather edges and narrow weld grooves are to be avoided.

Preferably the length and taper angle of each flaring weld portion 22 of the coupling 20 is equal to the length and taper angle of the flaring weld portion 16 of each collar 12, the taper angle being about fifteen degrees, e.g. in the range of five to twenty five degrees, but is ultimately determined by the requirements first for a total diameter increase that is the minimum needed to provide adequate spacing from the pipe to permit welding without special cooling precautions and second that there be enough length to the flaring weld portion to prevent the adjacent cylindrical portions 21 and 15 from getting overheated during welding. A length of ¾ inch is about the minimum length for each flaring weld portion 16, 22 for a two inch diameter pipe having a ¼ inch wall thickness, and for larger diameter and thicker wall pipes where the time of welding and amount of weld metal deposited is greater the length preferably is larger, e.g. for 16 inch diameter pipe, a total spacing of about ¼ inch is preferred.

The thickness of the flaring portions of the collars and couplings also influences the length necessary to insulate the weld from the pipe, for the area of surface for heat dissipation is independent of the thickness and the thinner the flaring portions, the less heat they will transmit. However, for strength reasons, the coupling and collars will usually have about the same thickness as the pipe to be connected, and will have a minimum thickness limited by weldability e.g. ⅛ inch and a maximum thickness limited by weight e.g. one inch, although these limits can be exceeded.

Referring again to FIG. 2 the cylindrical portion 21 of coupling 20 has a lining 30 made of an elastomer compatible with the fluid to be handled by pipe 10, e.g. the lining may be neoprene having a durometer hardness in the range of 60 to 95. The thickness of the lining 30 of the coupling is about the same as that of lining 11 of the pipe, e.g. one to three thirty-seconds of an inch. At the middle of the length of lining 30 there is an inwardly projecting radial flange 31 having a thickness of greater than the maximum spacing of two pipe end faces 32 (see FIGS. 1 and 3) when the pipes are made up with coupling 20. The flange 31 is therefore compressed axially between the pipe ends to seal therewith. Flange 31 keeps the pipe ends and the coupling out of contact with the fluid within the pipes and together with lining 11 prevents internal corrosion of the pipe.

The lining 30 is bonded to the interior of coupling 21, e.g. by cement and vulcanization in situ. The inner diameter of the thin sleeve portions 33 of the lining at each side of flange 31 is such as to permit the coupling to be slipped over the end of a pipe of the largest diameter expected under the tolerances set by standards for the nominal size of pipe, but with some radial compression of the sleeves to insure a snug fit and concentricity of the coupling and pipe ends 35 (see FIG. 3).

The radial flange 31 of lining 30 is provided with buttresses 37 (see FIG. 2) at its base adapted to fill the usual 45 degree weld bevels 38 (see FIG. 3) at the outer peripheries of pipe end faces 32, thereby to assure a good seal with the pipe end faces. In other words, the sides of flange 31 are correlative to the end faces of the pipes.

Referring now particularly to FIG. 3 there is shown the connection of the two pipe ends 35 with a coupling 20, the end faces 17 and 23 being welded together at 40. An arc shield ring 41 is disposed around each pipe end opposite the weld 40.

In making the connection shown in FIG. 3, the arc shield rings are first slipped over the pipe ends into a position with their midlines under the end faces 17 of the collars 12. If desired, the pipes can be manufactured with the arc shield rings already in place. Then the coupling 20 is slipped over each end of the pipe and the ends are drawn together by means of a suitable hydraulic jack of known construction, shown schematically at 50 (see FIG. 4), clamped at 51 to the pipes 10. With the end faces of coupling 20 adjacent the end faces of collars 12, the collar is tack welded to the collars. The welds 40 are then completed. The hydraulic jack can be removed and relocated farther down the pipe line prior to completion of weld 40 so that one man can be operating the jack and tack welding while another is completing welds.

Instead of a hydraulic jack, any other desired means can be used to draw the coupling and collars together. During the welding, the arc shield 41, preferably made of asbestos, electrically insulates the pipe end 35 so that the arc will not jump to the pipe end. The arc shield can be made of such cross section as to entirely fill the space between the pipe end and coupling and collar, as shown at 41' in FIG. 5, thereby to exclude water.

During welding, the material in the space between the hot bead of weld 40 and the pipe end 35, whether it be all asbestos or part asbestos and part air, or some other material or combination of materials, provides means to thermally insulate the pipe end from the hot weld metal sufficiently to keep the pipe lining 11 below that which would destroy or damage the lining. For example the weld temperature may be of the order of 2000 degrees F. whereas the temperature of the PVC lining 11 must not exceed 150° F.

The length of the flaring portions 16 and 22 of the collar and coupling is sufficient to thermally insulate the weld bead 40 from the cylindrical portions 15 and 21 of the collar and coupling so that the latter do not get hot enough to damage the pipe and its lining. The cylindrical portion 21 of the coupling is of course itself spaced from the pipe ends by its lining sleeves 33 but these should not be permitted to get hot either, for the coupling lining material is just as susceptible to damage as the pipe lining material. Being on the outside of the pipe ends however, it is not especially harmful if the lining sleeves 33 are overheated for a portion of their lengths so long as flange 31 remains intact. The cylindrical portions 15 of the collars are preferably concentric with the pipe ends and so slightly spaced therefrom, but in the course of welding the collars to the pipe ends at 13, the cylindrical portions likely will contact the pipe ends at some points. This will not be harmful however for reliance is placed on the lengths of flaring portions 16 to insulate the cylindrical portions from the heat of the weld bead 40. The welds 13 are formed before the pipe is lined.

Although the method of the invention makes it unnecessary to fill the pipe connection with water prior to completing weld 40, this may be done anyway if the lining 11 is a particularly delicate one. In the case of a pipe lined with a separate rigid tube of PVC it may be desirable to fill the tube with water prior to completing weld 40, but in the case of pipes in which the lining 11 is sprayed on, water filling is not usually needed, although it may be employed as a further precaution.

Although each collar and the coupling are shown as each having a distinct flaring weld portion and a cylindrical centering portion, these may be in practice merged to the point where no separate cylindrical portion exists. The flaring portion need not be conical but may have other flaring shapes, or even a stepped shape.

What is claimed is:

1. A pipe connection comprising two plastic lined metal pipes each having adjacent to but spaced from the adjacent pipe end faces a collar welded at one end to the pipe end and having its other end of larger inner diameter than the end welded to the pipe, a metal coupling bridging the two pipe ends and having its end faces welded to the end faces of the collars and having a smaller inner diameter adjacent its mid-portion than adjacent its end faces, an elastomer lining over the mid-portion of the coupling, said lining having radial flange projecting inwardly between the pipe end faces and compressed therebetween, said flange having sides correlative to the end faces of the pipes when the flange is unstressed.

2. Connection according to claim 1 wherein said coupling includes a cylindrical mid-portion coextensive with said elastomer lining and unlined conically flaring end portions, said elastomer lining making a friction fit with said pipes, and said collars each including a cylindrical portion adjacent the end of the collar welded to the pipe and a conically flaring portion adjacent the conically flaring portion of the coupling.

3. Connection according to claim 2 including an asbestos arc shield substantially filling the space between the pipes and said conically flaring portions of the coupling and collars.

4. A pipe connection comprising:
   two plastic lined metal pipes disposed in end to end relationship,
   each pipe having adjacent to but spaced from the terminus of the adjacent pipe end a collar welded at one end to the pipe, the other end of each collar being of larger inner diameter than the end welded to the pipe,
   a metal coupling bridging the two pipe ends and having its ends welded to said other ends of the collars, said coupling having a smaller inner diameter adjacent its mid-portion than adjacent its ends,
   a resilient lining over said mid-portion of the coupling, said lining having between and spaced axially from the ends thereof a radial flange projecting inwardly between the pipe ends and compressed therebetween.

5. Connection according to claim 4 wherein said coupling includes a cylindrical mid-portion coextensive with said elastomer lining and unlined conically flaring end portions, said elastomer lining being bonded at its outer periphery to the inner periphery of said cylindrical portion, the inner periphery of said lining making a friction fit with said pipes.

6. Connection according to claim 5 wherein said collars each include a cylindrical portion adjacent the end of the collar welded to the pipe and a conically flaring portion adjacent the conically flaring portion of the coupling.

7. Combination according to claim 6, wherein said cylindrical portion of each collar has a larger inner diameter than the outer diameter of the pipe leaving an annular gap therebetween.

8. Connection according to claim 7 including an electrically insulating refractory arc shield ring between the pipe and each of the welds between the coupling and the collar.

9. Metal pipe coupling including a tubular, metal, center portion of substantially constant inner diameter extending from the mid-section of the coupling toward both ends thereof and at each end a flaring tubular metal portion of increasing inner diameter progressing from said center portion toward the end, said center portion having an elastomeric lining extending over the inner periphery thereof and bonded thereto, the ends of said coupling having a larger inner diameter than the outer diameter of said lining at the mid-portion of said coupling, said lining having an inwardly projecting radial flange at its mid-portion, both sides of said flange being perpendicular to the coupling axis from adjacent the inner periphery of the flange toward the outer periphery of the flange, the sides of the flange being tapered from the outer periphery of said perpendicular portions of the sides to the outer periphery of the flange forming annular buttresses at the base of the flange at each side thereof, said elastomer lining having a durometer hardness of between 60 and 95, said lining terminating adjacent the junctures of said center and flaring portions of the coupling leaving the inner peripheries of said flaring portions bare.

References Cited

UNITED STATES PATENTS

| 1,871,371 | 8/1932 | Jackson | 285—55 X |
| 1,986,357 | 1/1935 | Perry | 285—383 X |
| 2,388,924 | 11/1945 | Mercier | 285—286 X |
| 2,509,363 | 5/1950 | Page | 285—383 X |
| 2,635,901 | 4/1953 | Osborn | 285—383 X |
| 3,288,495 | 11/1966 | Newell et al. | 285—337 X |

FOREIGN PATENTS

| 1,199,181 | 6/1959 | France. |
| 1,431,797 | 2/1966 | France. |
| 642,206 | 2/1937 | Germany. |
| 819,390 | 9/1959 | Great Britain. |
| 898,640 | 6/1962 | Great Britain. |
| 657,723 | 11/1963 | Italy. |

REINALDO P. MACHADO, Primary Examiner

D. W. AROLA, Assistant Examiner

U.S. Cl. X.R.
285—55, 286, 369